Oct. 3, 1950          A. L. AUSTIN          2,524,557
RADIANT HEATING SYSTEM
Filed March 27, 1948          3 Sheets-Sheet 1
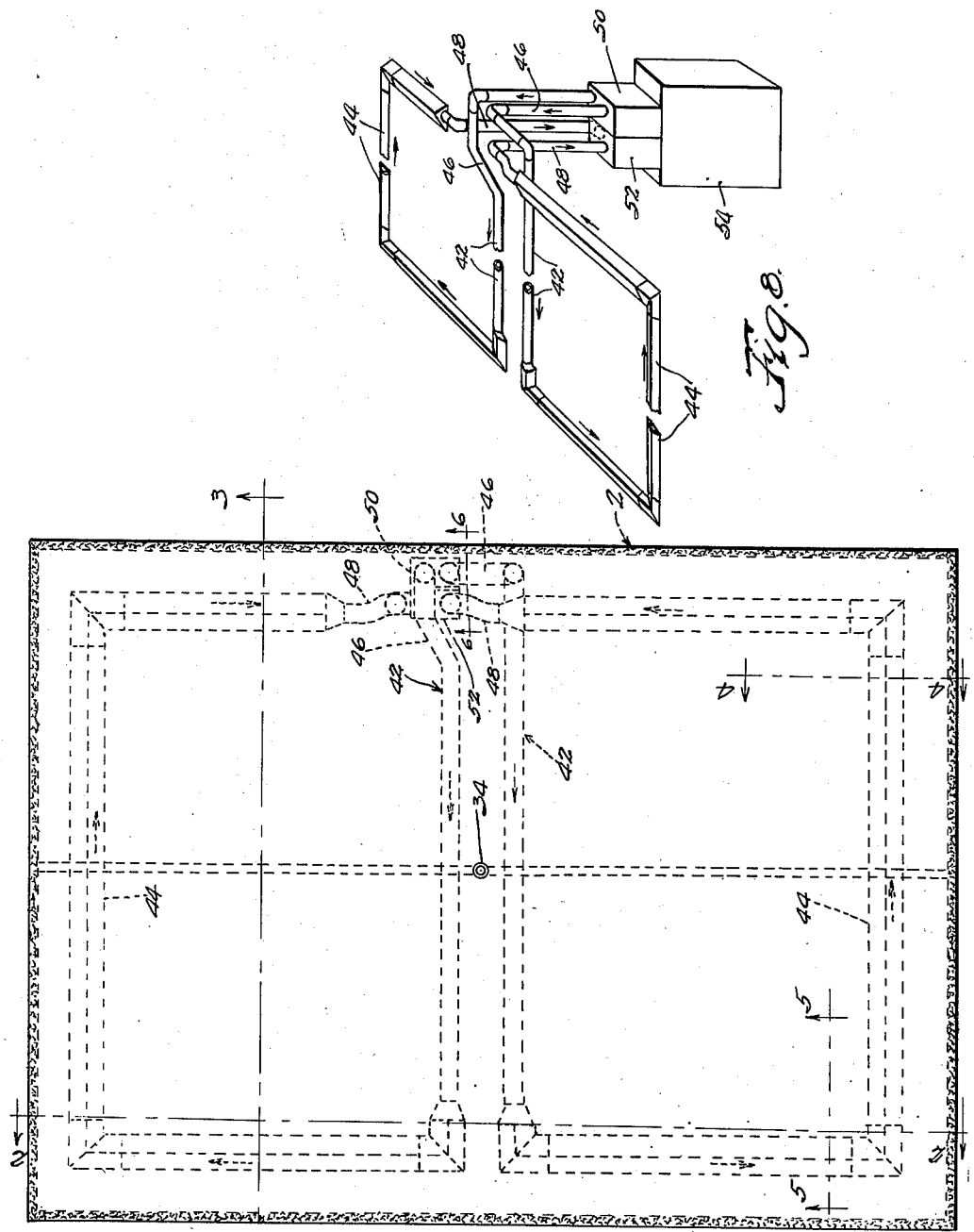
INVENTOR.
Abraham L. Austin
BY B. Gordon Aller Oct. 3, 1950          A. L. AUSTIN          2,524,557
RADIANT HEATING SYSTEM
Filed March 27, 1948          3 Sheets-Sheet 2
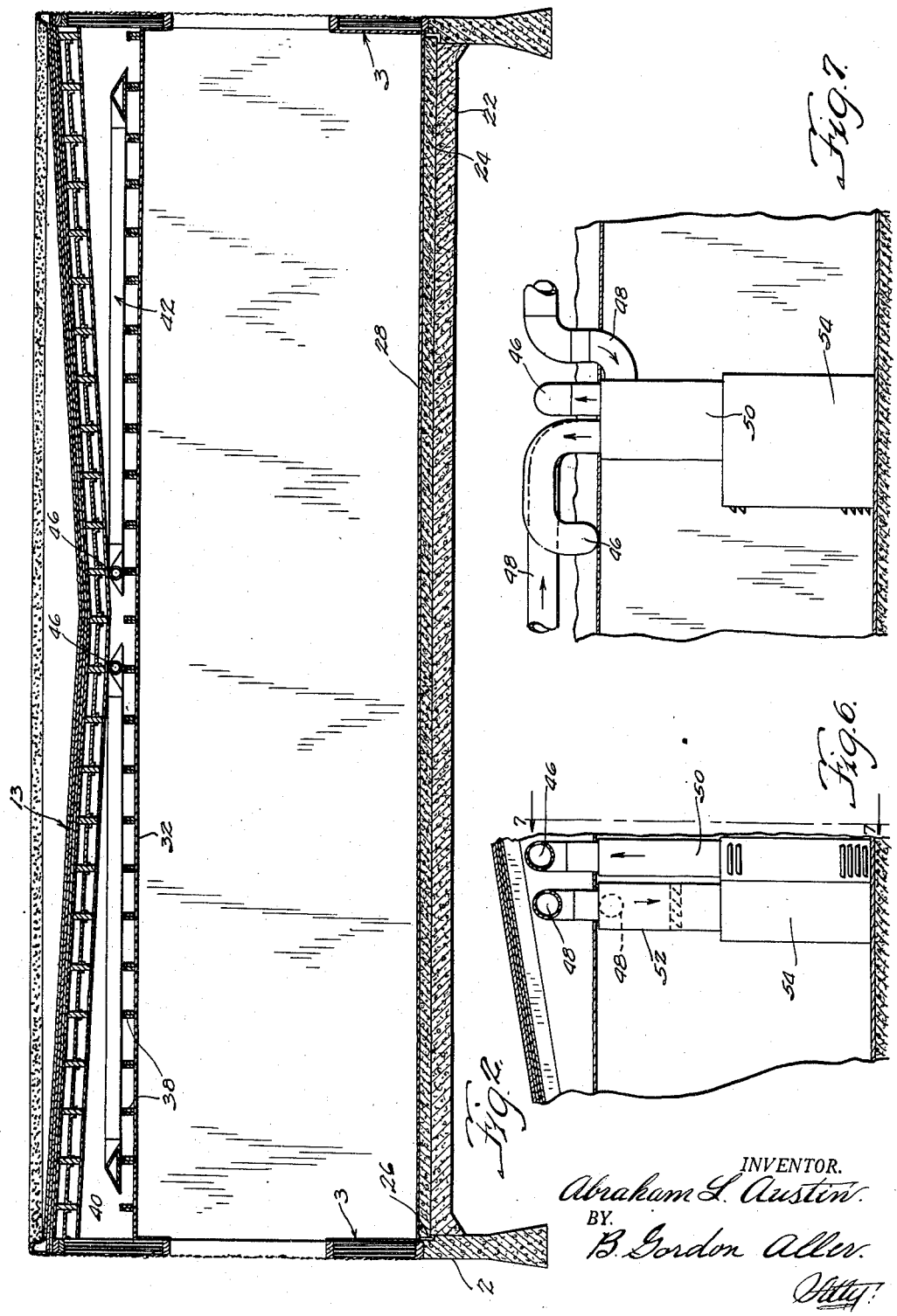
INVENTOR.
Abraham L. Austin
BY
B. Gordon Allen
Atty.

Oct. 3, 1950      A. L. AUSTIN      2,524,557
RADIANT HEATING SYSTEM
Filed March 27, 1948      3 Sheets-Sheet 3
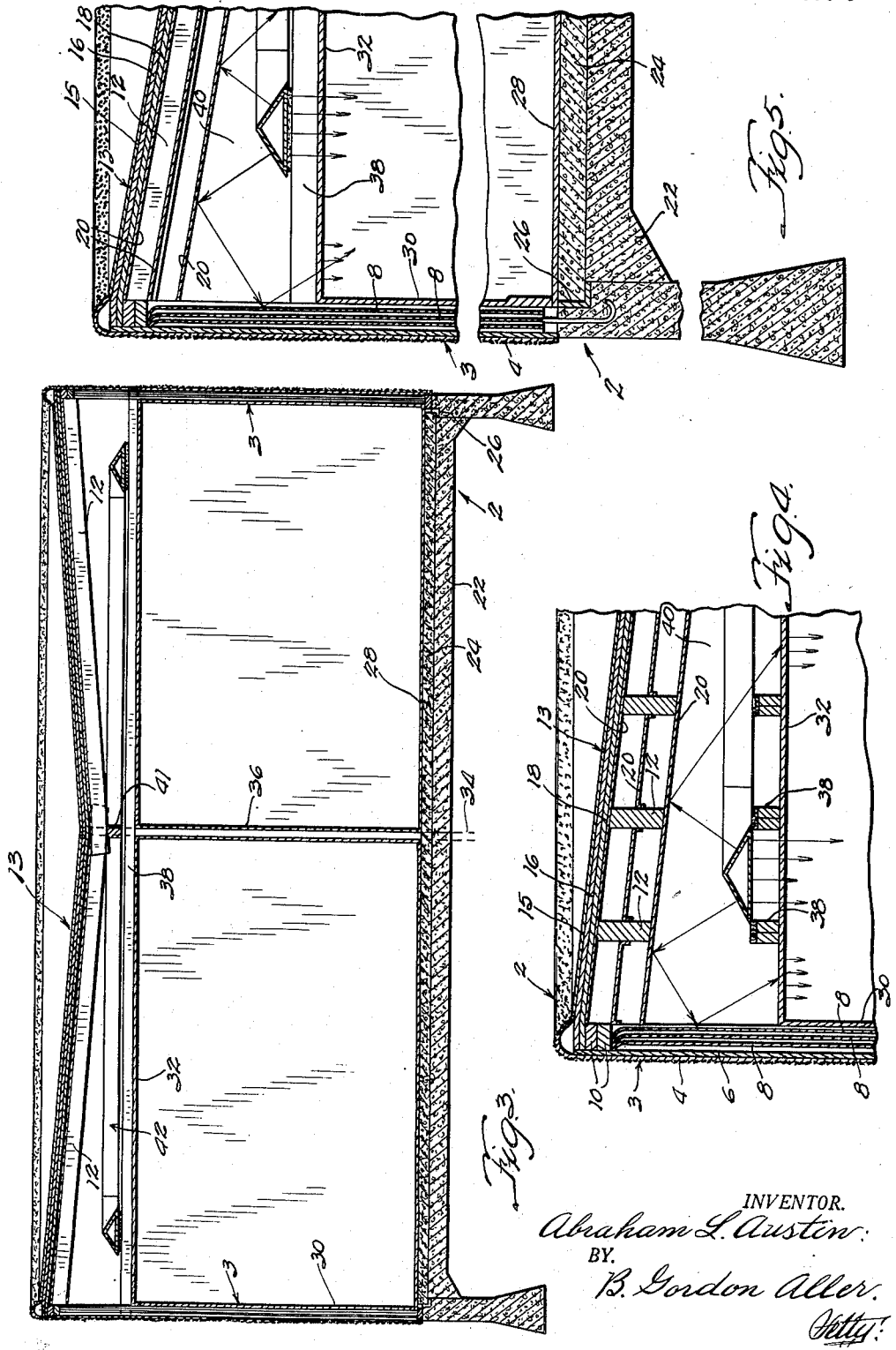
INVENTOR.
Abraham L. Austin
BY B. Gordon Aller
Atty.

Patented Oct. 3, 1950

2,524,557

UNITED STATES PATENT OFFICE 2,524,557

RADIANT HEATING SYSTEM

Abraham L. Austin, Oak Park, Ill.

Application March 27, 1948, Serial No. 17,419

4 Claims. (Cl. 237—50)

This invention relates to radiant heating systems for dwelling units, and more particularly to a novel method and means for heating radiant panels in such a system.

Various means for heating the panels in prior art systems have been utilized, including the circulation of a heating fluid such as hot air through a chamber or plenum defined at one side thereof by the radiant panel. Such arrangements are not only expensive but result in vapor collection within the plenum, particularly when the latter is disposed beneath the roof.

In other known systems, the panel has been heated by a multiplicity of hot air conduits in direct contact with the panel, a complicated and expensive arrangement which causes localized overheating of the panel along the areas contacting the conduits.

A general object of the invention is to devise a novel economical method and means for heating a radiant panel in a radiant heating system for dwelling units.

A more specific object of the invention is to heat the panel by radiation and natural convection as distinguished from conduction and forced convection by fans or blowers.

Another object of the invention is to provide a novel method and means for heating a radiant panel by a single conduit arranged in a loop adjacent the perimeter of the panel and adapted to convey a fluid heating medium, preferably hot air.

A further object of the invention is to devise a radiant heating system particularly adapted to the use of a ceiling as a radiant panel, with a heating chamber between the ceiling and roof of the dwelling unit.

Still another object of the invention is to provide a radiant ceiling panel which is somewhat hotter at its perimeter than at its center to compensate for peripheral heat losses by conduction, convection, and infiltration from the periphery of the dwelling unit.

The foregoing and other objects and advantages of the invention will become apparent from a consideration of the following specification and the accompanying drawings, wherein Fig. 1 is a top plan view of a dwelling unit embodying a preferred form of the invention, the roof being broken away to clarify the construction;

Figs. 2 to 5, inclusive, are sectional views taken respectively on the lines 2—2, 3—3, 4—4, and 5—5 of Fig. 1;

Fig. 6 is a sectional view on the line 6—6 of Fig. 1, showing the furnace and the hot air inlet and outlet chambers or plenums;

Fig. 7 is a view on the line 7—7 of Fig. 6; and

Fig. 8 is a diagrammatic perspective view of the hot air circulating system.

Describing the invention in detail, the system is illustrated as applied to a dwelling unit 2 in the form of a house which may be divided by internal partitions (not shown) into any desired number of rooms.

The walls 3 of the house as best seen in the enlarged view of Figs. 4 and 5 comprise an outer layer 4, formed for example of stucco, covering an inner layer 6 of heat insulating material such as Celotex. Inside the layer 6 are several reflective heat-insulating layers 8 of highly polished material such as, for example, aluminum foil, which reflects radiant heat waves and has a very low coefficient of heat absorption.

The layers 8 are clamped at their upper ends between the layer 6 and a pair of beams 10. The beams 10 of the sides of the unit are connected to rafters 12 supporting a roof 13, which comprises an outer layer 14 of conventional roll roofing 15 covering a sheathing 16. Beneath the sheathing is an insulating layer 18 formed, for example, of Celotex, and beneath the layer 18 are three layers 20 of reflective heating insulating material such as aluminum foil.

The walls 3 are supported on a foundation 22 which supports a concrete subfloor 24 insulated at the perimeter thereof by heat insulating material 26. The subfloor 24 supports a floor 28, from which inner walls 30 extend upwardly to a ceiling 32, said inner walls and ceiling being formed of any desired material such as plaster board or rock lath.

It may be noted that the roof 13 slopes from the perimeter thereof toward the center of the dwelling unit to form an inverted pyramidal structure, for a purpose hereinafter described, and a drain pipe 34 is provided at the center of the roof and extends downwardly through a bearing partition 36 supporting a plurality of joists 38 above the ceiling 32 in a heating chamber or plenum 40 between the roof 13 and the ceiling 32. A beam 41 (Fig. 3) on the joists 38 supports the inner ends of rafters 12.

The dwelling unit 2, as illustrated, is heated by the ceiling 32 which acts as a radiant panel, and the ceiling is heated by a pair of hot air conduits 42, each arranged in a loop having a generally triangular intermediate portion 44 and round inlet and outlet portions 46 and 48, for a purpose hereinafter described. The conduits are supported by the joists 38 in spaced relationship to the ceiling 32.

The inlet portions 46 of the conduits 42 are connected to a hot air outlet chamber or plenum 50 (Figs. 6 and 7) and the outlet portions 48 of the conduits 42 are connected to a return or inlet plenum 52 which conducts the returning air through a furnace 54, herein illustrated as an oil furnace. After the air has been heated in the furnace 54, it is forced, as for example by a fan (not shown), from the outlet plenum 50 into the inlet portions 46 of the heating conduits.

Referring now to Figs. 1 and 8, which show the fluid circulating system in detail, it will be seen that the inlet portions 46 of the conduits 42 are round in cross section and extend from the outlet plenum 50 transversely of the dwelling unit 2 to connect with the intermediate portions 44 which extend around the perimeter of the dwelling unit to merge with the outlet portions 48 which are connected to the inlet plenum 52 of the furnace 54. Thus the triangular intermediate portions of the conduits 42 are disposed adjacent the outer periphery of the dwelling where the greatest heat is needed, due to heat losses. It will be understood that the portions 44 of the conduits, although preferably triangular in cross section may be of any rectilinear construction which affords a relatively great surface area for the internal volume of hot air conveyed by the conduit.

It will be noted from a consideration of Figs. 4 and 5 that the radiant heat waves from the side and top of the conduits 42 are reflected by the layers 20 and 8 to the ceiling 32, and the waves from the bottom of the conduit impinge directly on the ceiling 32 which thus becomes a radiant panel. The ceiling is heated primarily by radiation. However, the position of the conduit in the chamber 40 sets up a natural convection system which additionally heats the ceiling 32. The disposition of the conduit portions 44 adjacent the perimeter of the room causes the periphery of the ceiling to have a somewhat greater temperature than the central portion of the ceiling, and this action is complemented by the manner in which the roof insulation 20 slopes toward the center of the roof as best seen in Figs. 4 and 5, thereby focusing many of the heat waves toward the perimeter of the room. Although it will be apparent that many of the heat waves will strike the ceiling at its center, nevertheless a greater number of the heat waves will strike the ceiling closer to its periphery than if the roof insulation 20 were horizontally disposed.

The inlet portions 46 of the conduits 42 extend across the central portion of the roof, and heat waves therefrom are also focused toward the periphery of the ceiling 32 although a relatively great number of these waves strike the center of the ceiling to heat that portion of the dwelling unit.

It will be understood that most of the radiant heat waves from the conduits 42 are absorbed by the ceiling to heat the same. However, a few of these waves pass through the ceiling into the space therebelow. The ceiling in turn, when heated, becomes a radiant panel from which radiant heat waves are directed into the dwelling unit to heat the objects therein.

In the arrangement shown, the unit is heated by two looped conduits 42, and this has been found to be preferable in relatively large units. However, in smaller units a single conduit may be used, encircling the ceiling adjacent its periphery.

It will be understood that I do not wish to be limited to the details of the system disclosed which are merely by way of illustration and not limitation, as various and other forms of the system will, of course, be apparent to those skilled in the art, without departing from the spirit of the invention or the scope of the claims.

I claim:

1. A method of heating a radiant ceiling panel in a dwelling having a roof above the panel defining a heating plenum therewith, which comprises lining said plenum with reflective means, circulating a fluid heating medium through a conduit in said plenum in spaced relationship to said roof, said reflecting means focusing radiant heat waves from said conduit toward the periphery of the panel.

2. A dwelling unit comprising walls, a roof having an inverted pyramidal form, a ceiling connecting said walls beneath the roof to define a plenum therewith, reflecting means lining said roof and walls in said plenum for reflecting radiant heat waves, and conduit means extending through said plenum in spaced relationship to said panel, said conduits having a heating medium therein, said heating medium cooperating with said reflecting means for heating said dwelling unit.

3. A dwelling unit comprising walls and a roof having an inverted pyramidal form, a ceiling connecting said walls beneath the roof to define a plenum therewith, reflecting means lining said roof and walls in said plenum for reflecting radiant heat waves, a pair of conduits extending through said plenum transversely of said dwelling and adjacent the center thereof in reversely arranged loops around the plenum adjacent the periphery thereof, said conduits carrying a heating medium co-operating with said reflecting means for heating said dwelling unit.

4. A dwelling comprising walls and a roof, a ceiling connecting said walls beneath said roof and defining a plenum therewith, conduit means for circulating a heating medium through said plenum in spaced relationship to said ceiling and roof, a heating medium circulating through said conduit means and reflecting means lining the roof and walls in said plenum and co-operating with said heating medium to focus radiant heat waves toward the perimeter of said ceiling.

ABRAHAM L. AUSTIN.

REFERENCES CITED

The following references are of record in the file of this patent:

UNITED STATES PATENTS

| Number | Name | Date |
|---|---|---|
| 1,044,230 | Newhall et al. | Nov. 12, 1912 |
| 2,205,001 | Timmis et al. | June 18, 1940 |
| 2,240,951 | Harnjy | May 6, 1941 |
| 2,364,220 | Johnson | Dec. 5, 1944 |

FOREIGN PATENTS

| Number | Country | Date |
|---|---|---|
| 25,046 | Great Britain | of 1898 |
| 850,830 | France | Sept. 18, 1939 |